United States Patent
Noh et al.

(10) Patent No.: US 9,440,355 B2
(45) Date of Patent: Sep. 13, 2016

(54) MOBILE ROBOT

(71) Applicant: LG ELECTRONICS INC., Seoul (KR)

(72) Inventors: Dongki Noh, Seoul (KR); Seungmin Baek, Seoul (KR); Younguk Ku, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/527,402

(22) Filed: Oct. 29, 2014

(65) Prior Publication Data

US 2015/0120056 A1    Apr. 30, 2015

(30) Foreign Application Priority Data

Oct. 31, 2013   (KR) .................. 10-2013-0131622

(51) Int. Cl.

| | |
|---|---|
| *B25J 9/16* | (2006.01) |
| *G02B 27/22* | (2006.01) |
| *H04N 5/74* | (2006.01) |
| *G05D 1/02* | (2006.01) |
| *G01S 17/46* | (2006.01) |
| *G01S 17/93* | (2006.01) |
| *G01S 7/481* | (2006.01) |

(52) U.S. Cl.
CPC ............ *B25J 9/1676* (2013.01); *B25J 9/1697* (2013.01); *G01S 7/4814* (2013.01); *G01S 17/46* (2013.01); *G01S 17/936* (2013.01); *G05D 1/024* (2013.01); *H04N 5/74* (2013.01); *A47L 2201/04* (2013.01); *G05D 2201/0203* (2013.01); *Y10S 901/01* (2013.01)

(58) Field of Classification Search
CPC . A47L 2201/04; B25J 9/1676; B25J 9/1697; H04N 5/74; G01S 17/00; G01S 17/46; G01S 17/936; G01S 7/4814; G05D 1/024; G05D 1/0246; G05D 2201/0203; G05D 1/0248
See application file for complete search history.

(56) References Cited

U.S. PATENT DOCUMENTS

| | | | | |
|---|---|---|---|---|
| 5,642,164 A | * | 6/1997 | Ogawa ................... | G01B 11/00 348/335 |
| 2002/0047893 A1 | * | 4/2002 | Kremen ............... | G02B 5/1885 348/40 |
| 2009/0291569 A1 | * | 11/2009 | Tanaka ............... | B23K 15/0093 438/795 |
| 2010/0053565 A1 | * | 3/2010 | Mizushima .......... | G02B 3/0006 353/38 |
| 2013/0204483 A1 | * | 8/2013 | Sung ................... | A47L 11/4061 701/28 |
| 2013/0338831 A1 | * | 12/2013 | Noh ....................... | B25J 9/1676 700/259 |
| 2014/0115797 A1 | * | 5/2014 | Duenne ................ | G05D 1/0242 15/3 |

FOREIGN PATENT DOCUMENTS

| | | |
|---|---|---|
| DE | 102011051729 A1 | 1/2013 |
| EP | 2623010 A2 | 8/2013 |
| EP | 2677386 A1 | 12/2013 |

* cited by examiner

*Primary Examiner* — Dale Moyer
(74) *Attorney, Agent, or Firm* — Dentons US LLP

(57) ABSTRACT

Disclosed is a mobile robot including a main body and a pattern irradiation unit emitting a cross-shaped optical pattern including a horizontal line optical pattern and a vertical line optical pattern intersecting the horizontal line optical pattern. The pattern irradiation unit includes a light source and a lens converting light emitted from the light source into the cross-shaped optical pattern, the lens includes convex cells on an incidence surface upon which the emitted light is incident, the incidence surface is divided into a first area converting the light emitted from the light source into the horizontal line optical pattern and a second area converting the light emitted from the light source into the vertical line optical pattern, vertical convex cells extended in parallel in the vertical direction are formed in the first area, and horizontal convex cells extended in parallel in the horizontal direction are formed in the second area.

21 Claims, 14 Drawing Sheets

116

FIG. 10
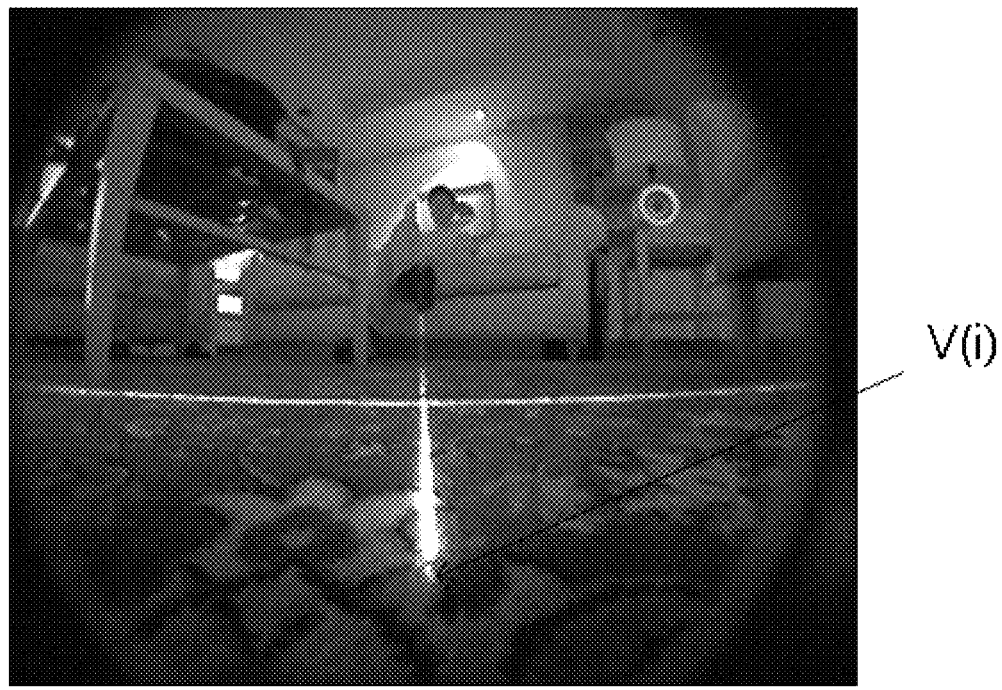
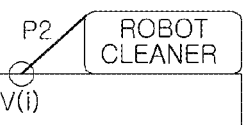
FIG. 11(a)
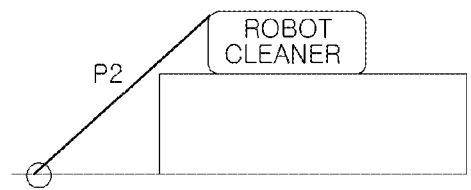
FIG. 11(b)

MOBILE ROBOT

CROSS-REFERENCE TO RELATED APPLICATION

This application claims the benefit of Korean Patent Application No. 10-2013-0131622, filed on Oct. 31, 2013 in the Korean Intellectual Property Office, the disclosure of which is incorporated herein by reference.

BACKGROUND OF THE INVENTION

1. Field of the Invention

The present invention relates to a mobile robot detecting an obstacle using an optical pattern.

2. Description of the Related Art

In general, robots developed for industry are applied to factory automation. Recently, application fields of robots are expanding and not only medical robots and aerospace robots but also home robots used in general homes have been developed.

As a representative example of home robots, there is a robot cleaner. The robot cleaner is a kind of home appliance which autonomously travels about a cleaning area and absorbs foreign substances to clean the area. Generally, the robot cleaner spontaneously travels using a rechargeable battery and includes obstacle sensors to avoid obstacles. As the obstacle sensors, an ultrasonic sensor, an infrared sensor, etc. may be used.

These sensors assure some degree of accuracy in sensing whether or not an obstacle is present on a traveling path, but do not assure reliable accuracy in sensing a distance from an obstacle or sensing a floor condition in a cleaning area, such as a cliff.

SUMMARY OF THE INVENTION

An object of the present invention is to provide a mobile robot emitting uniform optical pattern.

The objects of the present invention are not limited to the above-mentioned objects and other objects that have not been mentioned above will become evident to those skilled in the art from the following description.

To achieve the above objects, there is provided a mobile robot including a mobile main body and a pattern irradiation unit to emit an optical pattern, including a first pattern comprising a line extending in a first direction and a second pattern comprising a line extending in a second direction intersecting the first pattern, to a region around the main body, wherein the pattern irradiation unit includes a light source to emit light and a lens to convert the light emitted from the light source into the optical pattern, wherein the lens includes convex cells on an incidence surface upon which light emitted from the light source is incident, the incidence surface is divided into a first area to convert the light emitted from the light source into the first pattern and a second area to convert the light emitted from the light source into the second pattern, wherein a first plurality of first convex cells, wherein the first plurality extends in a direction orthogonal to the first direction, are formed in parallel in the first area and a second plurality of second convex cells, wherein the second plurality extends in a direction orthogonal to the second direction, are formed in parallel in the second area.

BRIEF DESCRIPTION OF THE DRAWINGS

The above and other objects, features and other advantages of the present invention will be more clearly understood from the following detailed description taken in conjunction with the accompanying drawings, in which:

FIG. 10 is an input image in which optical pattern is photographed, displaying a proximal end V(i) and a distal end V(f) of a vertical line pattern;

FIG. 11(a) is a view illustrating a case that the proximal end V(i) is emitted to a floor under the robot cleaner;

FIG. 11(b) is a view illustrating a case that the proximal end V(i) is emitted to a region under a cliff.

DETAILED DESCRIPTION OF THE EMBODIMENTS

The advantages and features of the present invention, and the way of attaining them, will become apparent with reference to embodiments described below in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts.

Figure 1:
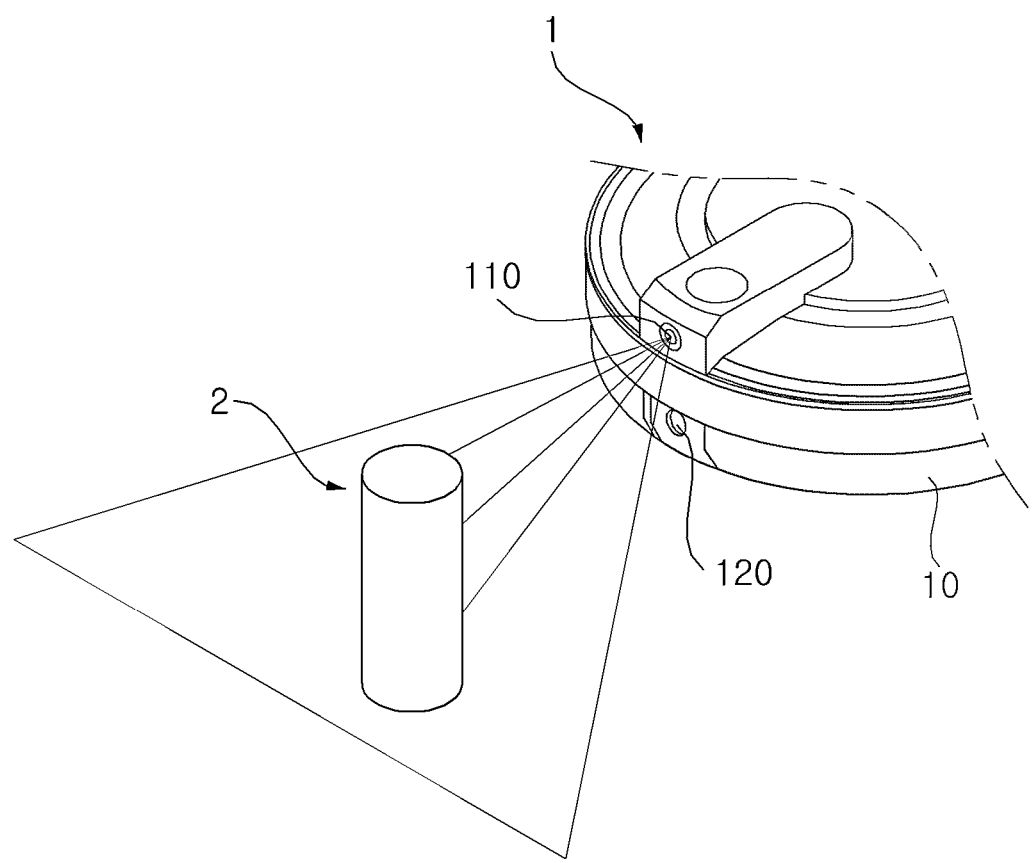
FIG. 1 is a perspective view illustrating a portion of a mobile robot in accordance with one embodiment of the present invention.
Figure 2:
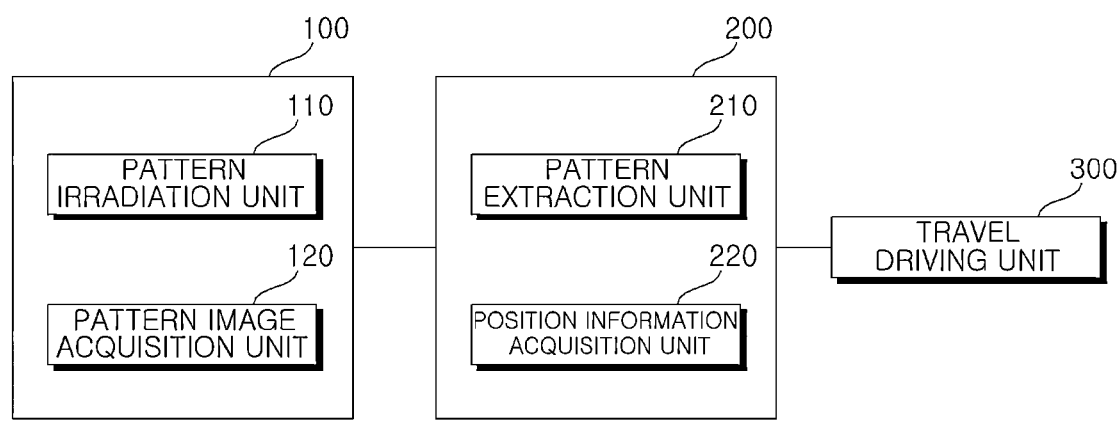
FIG. 2 is a block diagram schematically illustrating the configuration of a mobile robot in accordance with one embodiment of the present invention.

FIG. 1 is a perspective view illustrating a portion of a mobile robot in accordance with one embodiment of the present invention and FIG. 2 is a block diagram schematically illustrating the configuration of a mobile robot in accordance with one embodiment of the present invention.

With reference to FIGS. 1 and 2, a mobile robot in accordance with one embodiment of the present invention includes a mobile main body 10, an optical pattern sensor 100, and a controller 200.

The optical pattern sensor 100 emits an optical pattern to an active area in which the mobile robot is operated, and acquires an input image by photographing the area to which the optical pattern is emitted. The optical pattern may include at least one cross-shaped pattern, as exemplarily shown in FIG. 1.

The optical pattern sensor 100 may include a pattern irradiation unit 110 emitting the optical pattern and a pattern image acquisition unit 120 photographing an area to which the optical pattern is emitted. The optical pattern may include a first pattern comprising a line extending in a first direction and a second pattern comprising a line extending in a second direction intersecting the first pattern.

The pattern irradiation unit 110 may include a light source and an optical pattern projection element (OPPE). Light incident from the light source is projected on the OPPE, thus generating the optical pattern. The light source may be a laser diode (LD) or a light emitting diode (LED). Laser light has greater monochromaticity, straightness, and connectivity than other light sources and may thus precisely measure distance. Particularly, infrared light or visible light causes a large deviation in precision of distance measurement due to factors such as colors and materials of target objects and thus the laser diode may be used as the light source. The OPPE may include a lens, a mask, or a diffractive optical element (DOE), and a lens used as the OPPE will be described later in more detail.

The pattern irradiation unit 110 may emit light to an area in front of the main body 10. Particularly, an emission direction of the optical pattern may be a slightly downward direction so that the optical pattern may be emitted to the floor in an active area of the mobile robot. That is, in order to form a viewing angle for recognition of a distance from an obstacle, the emission direction of the optical pattern (i.e., the direction of a main axis C of the lens 500, with reference to FIG. 6C) and a main axis of a lens of the image acquisition unit 120 may not be parallel with each other and may form a designated angle. Here, the main axis C of the lens 500 may be downward from a horizontal line so that the optical pattern may be emitted to the floor.

The pattern image acquisition unit 120 acquires an input image by photographing the area to which the optical pattern is emitted. The pattern image acquisition unit 120 may include a camera, and such a camera may be a structured light camera.

Hereinafter, points, straight lines and curved lines forming the pattern are defined as pattern descriptors. A cross-shaped pattern includes two pattern descriptors of a horizontal line and a vertical line intersecting the horizontal line. Since the horizontal line serves to recognize an obstacle condition of a wide range and the vertical line is set to only a degree required to move the mobile robot, the length of the horizontal line of the cross-shaped pattern may be greater than the length of the vertical line. Further, several combinations of horizontal lines and vertical lines may be provided and the optical pattern may be a pattern including one horizontal line and a plurality of vertical lines intersecting the horizontal line.

The controller 200 may include a pattern extraction unit 210 extracting a pattern from an input image and a position information acquisition unit 220 acquiring position information of an object based on the extracted pattern.

The pattern extraction unit 210 may compare brightnesses of points in the input image sequentially in the vertical direction and define the points being brighter than the peripheral surroundings by a designated level or more, as candidate points. Then, the pattern extraction unit 210 may define a line on which these candidate points are arranged in the vertical direction as a vertical line.

Thereafter, the pattern extraction unit 210 detects a cross-shaped pattern descriptor formed by the vertical line and a line extending from the vertical line in the horizontal direction, among lines formed by the candidate points of the input image. The cross-shaped pattern descriptor doesn't need to be the entirety of a cross-shaped pattern. Since a vertical line pattern and a horizontal line pattern are modified according to the shape of a target object to which the optical pattern is emitted, although the shape of the pattern in the input image may be irregular and the size of a portion of the pattern at which the vertical line and the horizontal line intersect may be varied according to the shape of the target object, a '+'-shaped pattern descriptor is present at all times. Therefore, the pattern extraction unit 210 may detect a pattern descriptor, corresponding to the shape of a template desired to acquire, from the input image and define an overall pattern including the pattern descriptor. In case of a cross-shaped optical pattern, the template has a '+' shape.

The position information acquisition unit 220 may acquire position information, such as the width and height of the obstacle or a distance from the obstacle, based on the pattern defined by the pattern extraction unit 210. Since the emission direction of the pattern irradiation unit 110 is fixed, when the optical pattern is emitted to an area in which there is no obstacle, the position of the pattern in the input image is regular at all times. Here, the input image in this case is defined as a reference input image. Position information of the pattern in the reference input image may be calculated in advance based on triangulation. If it is assumed that coordinates of a random pattern descriptor Q forming a pattern in the reference input image are set to Q(Xi, Yi), a distance value Li(Q) from the emitted optical pattern to the pattern descriptor Q may be known in advance based on triangulation. Then, coordinates Q'(Xi', Yi') of the pattern descriptor Q in an input image acquired by emitting the optical pattern to an area in which there is an obstacle are moved from the coordinates Q(Xi, Yi) of the pattern descriptor Q in the reference input image. The position information acquisition unit 220 may acquire position information, such as the width and height of the obstacle or a distance from the obstacle, by comparing the coordinates Q and Q' of the pattern descriptor. Particularly, the width and shape of the obstacle or a distance from the obstacle may be detected according to the bending angle or degree of the horizontal line of the cross-shaped pattern and the height of the obstacle may be detected through a vertical displacement of the horizontal line or the length of the vertical line. Further, the distance from the obstacle may also be detected based on a displacement of the vertical line. If the horizontal line pattern alone is used, the recognizable height of the obstacle may be restricted and the position information of the obstacle may be mis-recognized. Thus, a cross-shaped pattern including horizontal and vertical lines may increase measurement precision.

A travel driving unit 300 serves to move the main body 10. The controller 200 may control the travel driving unit 300 according to position information acquired by the position information acquisition unit 220 so as to perform various traveling modes, such as avoiding obstacles, overcoming obstacles, and stopping.

Figure 3A:
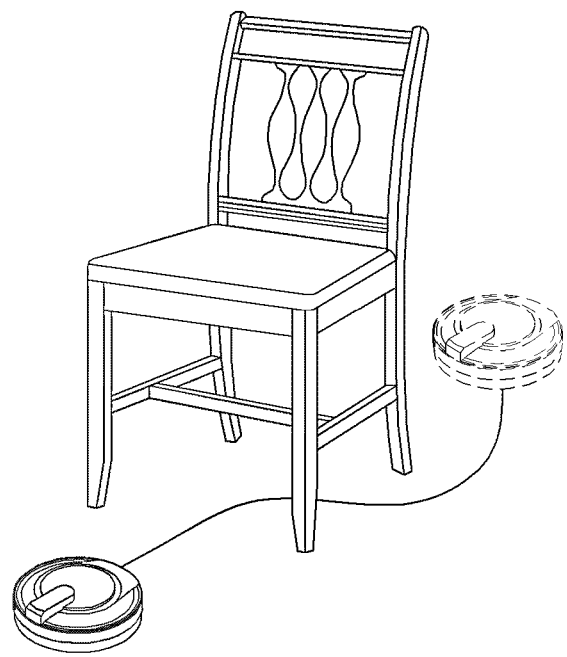
FIGS. 3A to 3C are views illustrating operations performed by a mobile robot in accordance with one embodiment of the present invention according to results of detection of an obstacle.
Figure 3B:
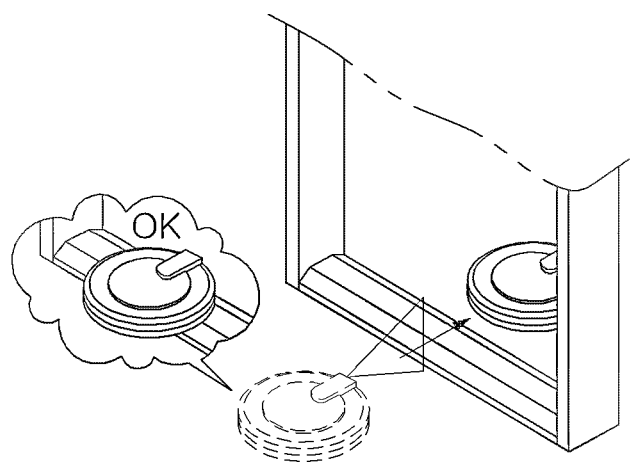
Figure 3C:
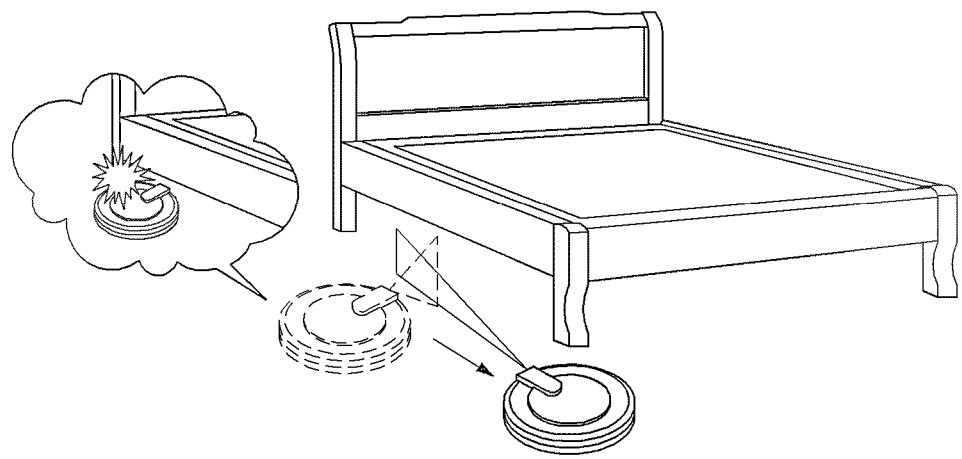

FIGS. 3A to 3C are views illustrating movements of the mobile robot according to kinds of obstacles. FIG. 3A is a view illustrating movement of the mobile robot if an obstacle is a chair having legs of a designated height or more. The mobile robot may move while avoiding the legs of the chair according to position information of the legs acquired by the position information acquisition unit 220 (avoidance traveling) and pass through a space under the chair if the height of the legs is greater than the height of the mobile robot (passage traveling). As exemplarily shown in FIG. 3B, if the height of a threshold is low enough to overcome, the mobile robot may move while stepping over the threshold (conquest traveling). FIG. 3C is a view illustrating movement of the mobile robot if an obstacle is a bed. The mobile robot may recognize the height of a bed frame through the position information acquisition unit 220 and, as a result of recognition, avoid the bed, if the height of the bed frame is excessively low, and pass through a space under the bed frame if the height of the bed frame is not excessively low.

Figure 4:
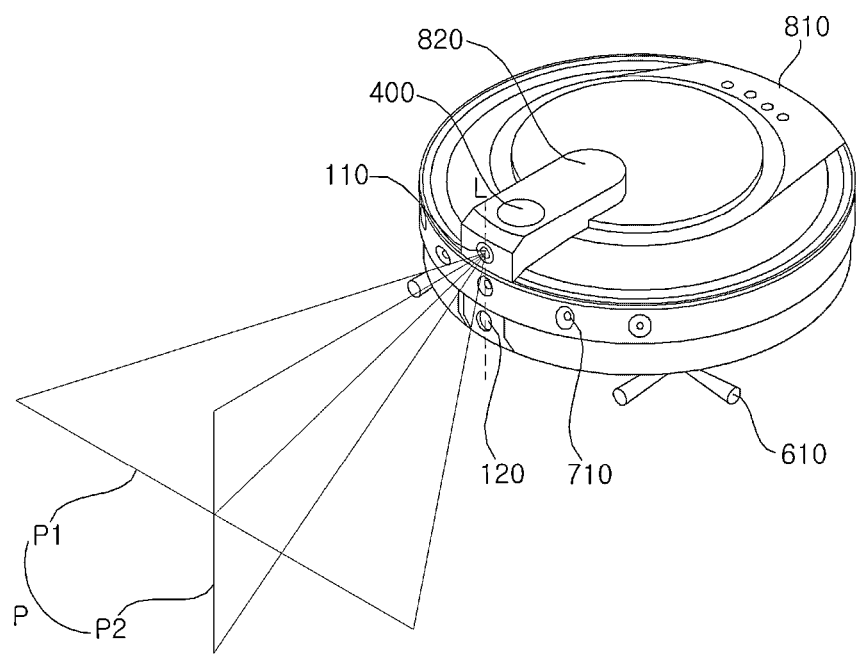
FIG. 4 is a perspective view illustrating a robot cleaner, as one example of a mobile robot.
Figure 5:
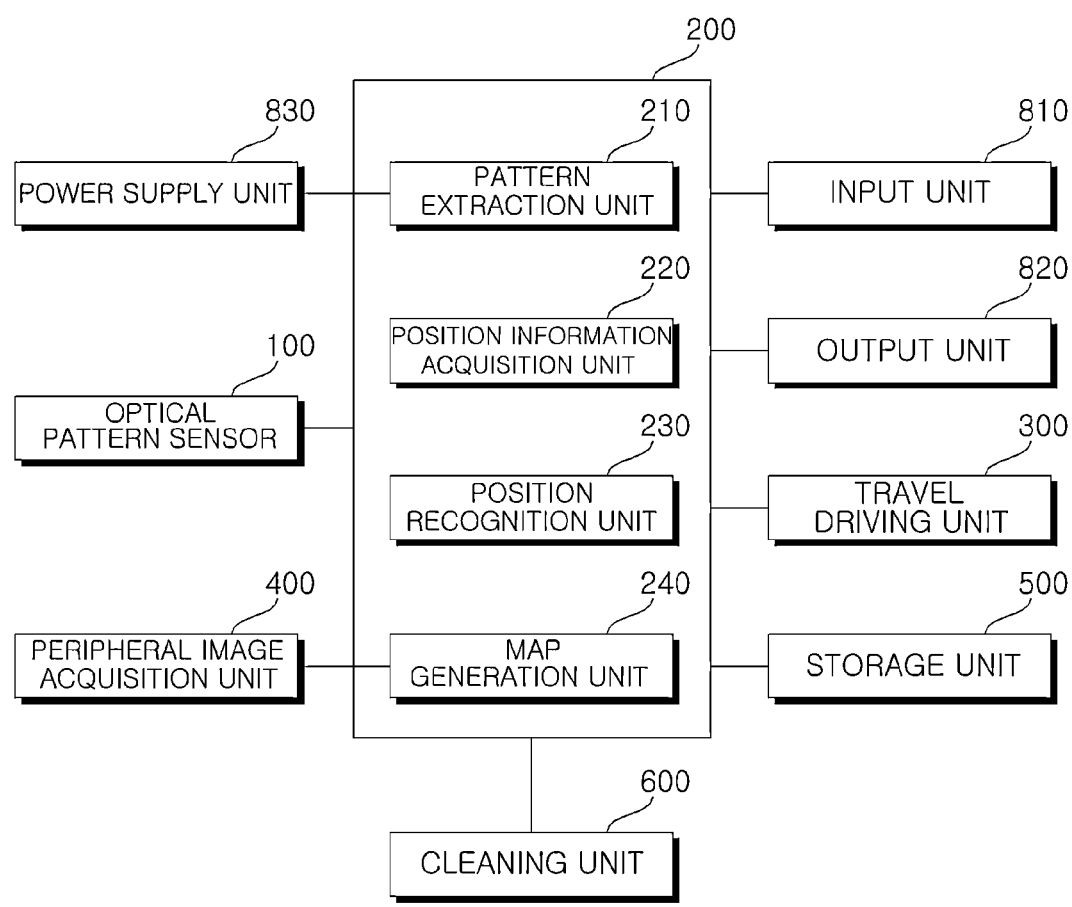
FIG. 5 is a block diagram schematically illustrating the configuration of the robot cleaner of FIG. 4.

FIGS. 4 and 5 are views illustrating a robot cleaner, as one example of the mobile robot. With reference to FIGS. 4 and 5, the robot cleaner may further include a peripheral image acquisition unit 400 acquiring image information by photographing the surroundings around the robot cleaner, in addition to the optical pattern sensor 100 and the controller 200. The peripheral image acquisition unit 40 may include at least one camera installed so as to face the top or the front. FIG. 4 is a view illustrating a general example of the robot cleaner in which one camera faces the top.

A position recognition unit 230 may extract feature points from an image acquired by the peripheral image acquisition unit 400 and recognize the position of the robot cleaner based on the feature points. Further, a map generation unit 420 may generate a peripheral map, i.e., a map of a cleaning space based on the position recognized by the position recognition unit 230. The map generation unit 420 may generate a peripheral map in which an obstruction state is reflected, in cooperation with the position information acquisition unit 220.

The travel driving unit 300 may include a wheel motor driving at least one wheel installed under the main body 10 and move the main body 10 according to a driving signal. The robot cleaner may include left and right driving wheels. A pair of wheel motors may be provided to rotate the left and right driving wheels. These wheel motors are driven independent of each other and the robot cleaner may change direction by rotating directions of the left driving wheel and the right driving wheel and a difference of speeds between the left driving wheel and the right driving wheel. Further, the robot cleaner may further include a subsidiary wheel supporting the main body 10, in addition to the driving wheels. Thereby, friction between the lower surface of the main body 10 and the floor may be minimized and the robot cleaner may smoothly move.

The robot cleaner may further include a storage unit 840. The storage unit 840 may store input images acquired by the pattern image acquisition unit 120, position information of an obstacle acquired by the position information acquisition unit 220, and a peripheral map generated by the map generation unit 240. Further, the storage unit 840 may store a control program driving the robot cleaner and data acquired therethrough. The storage unit 840 mainly uses a non-volatile memory (NVM or NVRAM). The non-volatile memory continuously maintains stored information even if power is not supplied. Non-volatile memories may include a ROM, a flash memory, a magnetic recording medium (for example, a hard disk, a floppy disk drive, or a magnetic tape), an optical disc drive, a magnetic RAM, a PRAM, etc.

The robot cleaner may further include a cleaning unit 600 absorbing dust or foreign substances around the robot cleaner. The cleaning unit may include a dust case storing collected dust, a suction fan providing force to absorb dust from a cleaning area, and a suction motor rotating the suction fan to absorb dust. The cleaning unit 600 may include a rotary brush provided on the lower portion of the main body 10 and rotated about a horizontal axis to float dust on the floor or a carpet into air, and a plurality of blades may be provided on the outer surface of the rotary brush in a spiral direction. Further, the robot cleaner may further include side brushes rotated about a vertical axis to clean a wall, a corner, etc., and the side brushes may be provided between the blades.

The robot cleaner may include an input unit 810, an output unit 820, and a power supply unit 830. The robot cleaner may receive various control instructions required to operate the robot cleaner through the input unit 810. The input unit 810 may include one or more input devices. For example, the input unit 810 may include a confirmation button, a setup button, a reservation button, a recharge button, etc. The confirmation button may receive instructions to confirm position information of an obstacle, image information, a cleaning area, or a cleaning map. The setup button may receive instructions to set or change a cleaning mode. The reservation button may receive reservation information. The recharge button may receive instructions to return the robot cleaner to a charging station for recharging the power supply unit 830. The input unit 810 may include a hard key or a soft key, a touch pad, etc., as input devices. Further, the input unit 810 may be formed as a touchscreen having the function of the output unit 820 which will be described below, also.

The output unit 820 displays a cleaning method or a traveling method, such as reservation information, a battery state, concentrated cleaning, space extension, and zigzag-type driving. The output unit 820 may output operating states of the respective units forming the robot cleaner. Further, the output unit 820 may display obstacle information, position information, image information, an internal map, a cleaning, a cleaning map, a designated area, etc. The output unit 820 may include elements, such as a light emitting diode (LED), a liquid crystal display (LCD), a plasma display panel, an organic light emitting diode (OLED), etc.

The power supply unit 830 may supply power to operate the respective units and include a rechargeable battery. The power supply unit 830 supplies not only power to drive the respective units but also operating power to perform traveling and cleaning and, if the remaining amount of power of the battery of the power supply unit 830 is insufficient, the robot cleaner moves to the charging station and the battery is recharged. The power supply unit 830 may further include a battery sensing unit to sense the recharge state of the battery. The controller 200 may display the remaining amount of power of the battery or the recharge state of the battery through the output unit 820 based on a sensing result of the battery sensing unit.

Figure 6A:
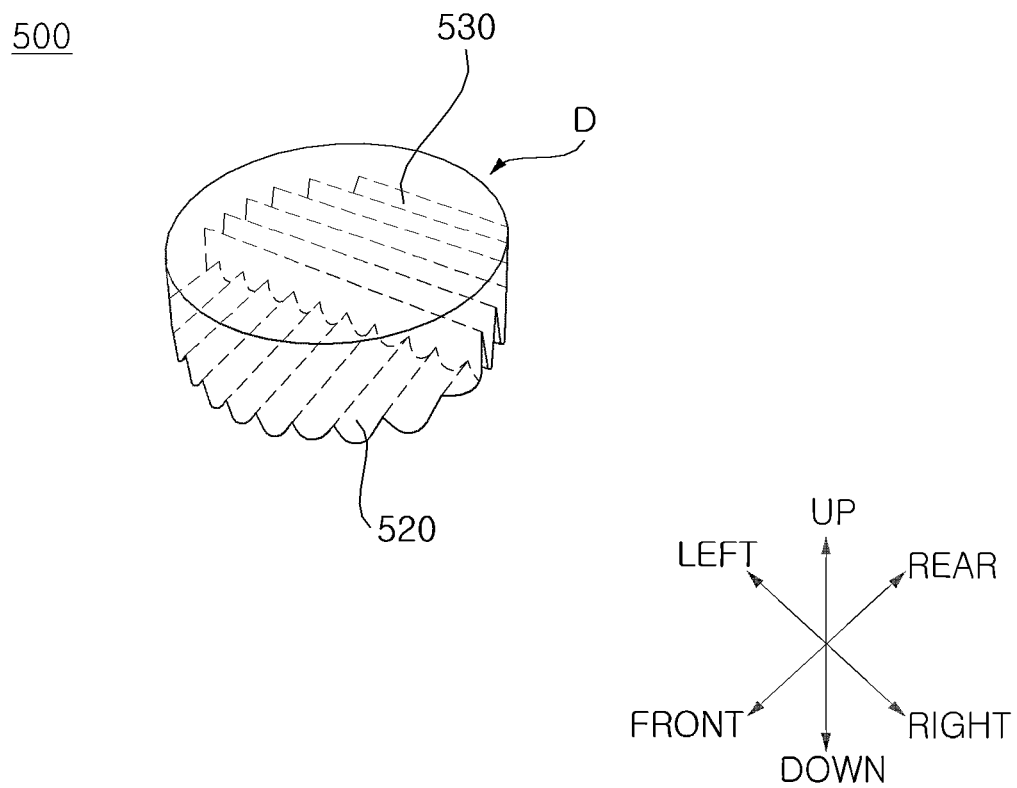
FIG. 6A is a perspective view of a lens of a pattern irradiation unit.
Figure 6B:
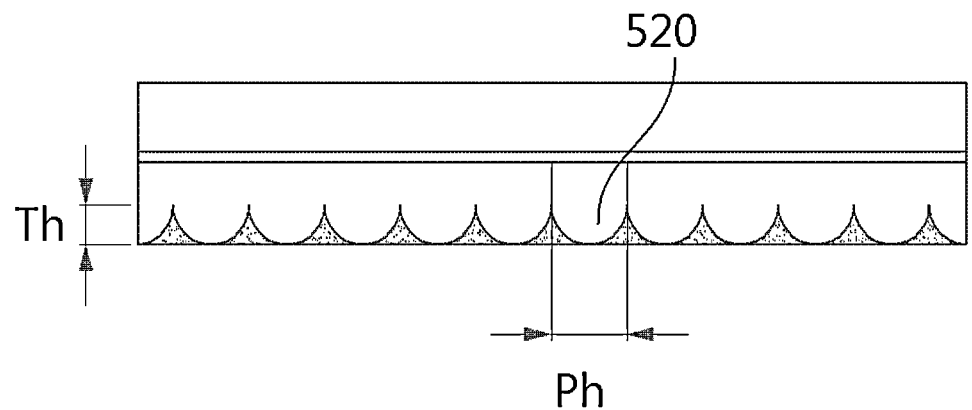
FIG. 6B is a front view of the lens shown in FIG. 6A.
Figure 6C:
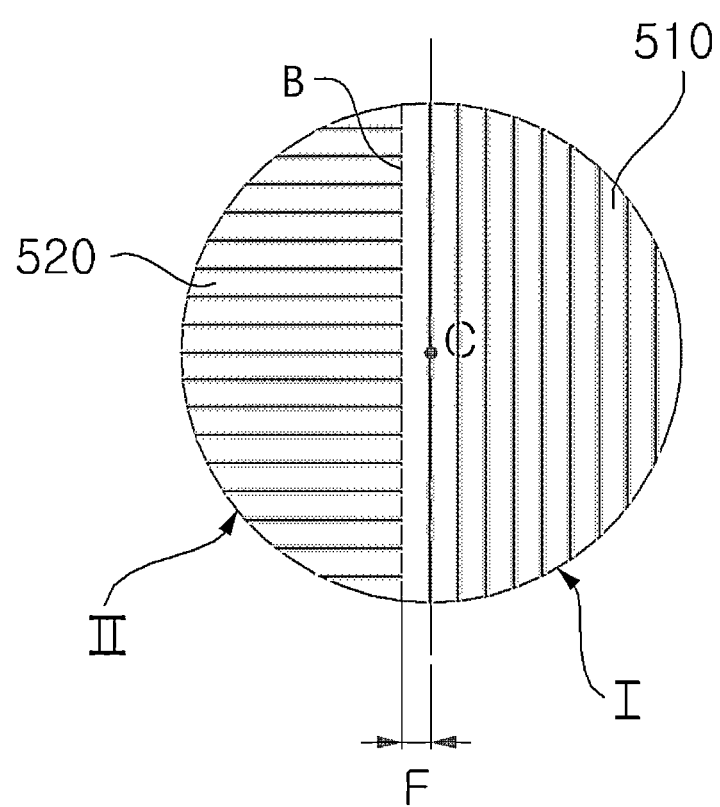
FIG. 6C is a bottom view of the lens shown in FIG. 6A.
Figure 6D:
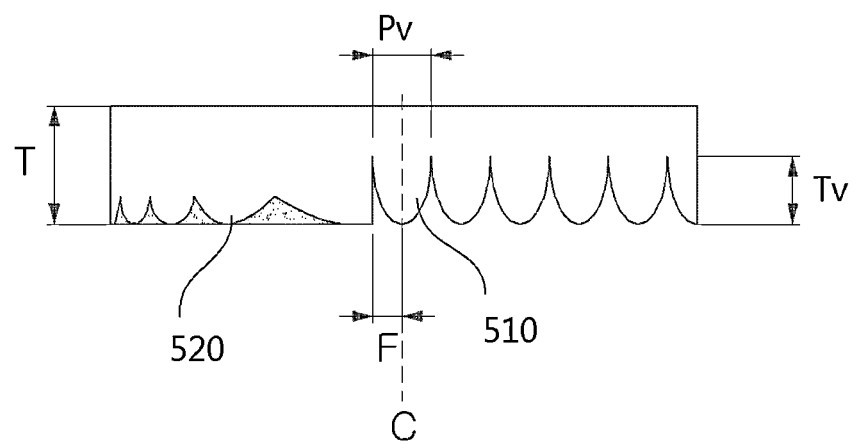
FIG. 6D is a right side view of the lens shown in FIG. 6A.
Figure 6E:
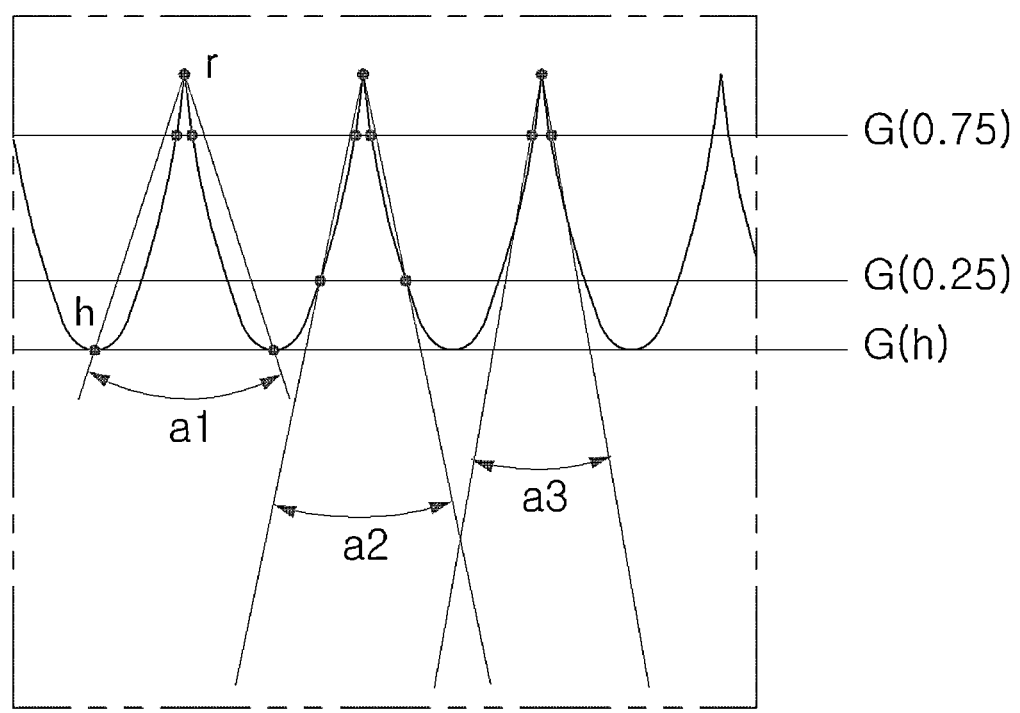
FIG. 6E is a sectional view illustrating vertical convex cells of FIG. 6A.

FIGS. 6A to 6E illustrate the lens 500 of the pattern irradiation unit 110. FIG. 6A is a perspective view of the lens 500 of the pattern irradiation unit 110, FIG. 6B is a front view of the lens 500 shown in FIG. 6A, FIG. 6C is a bottom view of the lens 500 shown in FIG. 6A, FIG. 6D is a right side view of the lens 500 shown in FIG. 6A, and FIG. 6E is a sectional view illustrating vertical convex cells 510 of FIG. 6A. As described above, the pattern irradiation unit 110 may include the light source (not shown) emitting light and the lens 500 as the optical pattern projection element (OPPE) on which light emitted from the light source is projected to generate an optical pattern. Hereinafter, with reference to FIGS. 6A to 6E, the lens 500 will be described.

The lens 500 includes convex cells 510, 520 on an incidence surface upon which light emitted from the light source is incident, the incidence surface is divided into a first area I to convert the light emitted from the light source into the first pattern (e.g. horizontal line optical pattern) and a second area II to convert the light emitted from the light source into the second pattern (e.g. vertical line optical pattern). A first plurality of first convex cells 510, wherein the first plurality extends in a direction orthogonal to the first direction, are formed in parallel in the first area I and a second plurality of second convex cells 520, wherein the second plurality extends in a direction orthogonal to the second direction, are formed in parallel in the second area II.

The lens 500 generates a cross-shaped optical pattern by converting light emitted from the light source. Convex cells 510 and 520 having a convex profile and extended are formed on an incidence surface of the lens 500 upon which light is incident. Diffraction of light mainly occurs on the lens 500. That is, light incident upon the incidence surface of the lens 500 having the discontinuously formed convex cells 510 and 520 is converted into an optical pattern extended in the directions intersecting the lengthwise directions of the block cells 510 and 520. The lens 500 is a plano-convex cylindrical lens in which respective convex cells 510 and 520 are extended in the horizontal or vertical direction, an incidence surface is convex toward the light source, and an exit surface 530 is planar.

The pattern irradiation unit 110 emits the optical pattern including a first pattern extended in a first direction and a second pattern extended in a second direction intersecting the first pattern part. Such an optical pattern is caused by structural characteristics of the lens 500. The lens 500 includes the convex cells 510 and 520 on the incidence surface upon which light emitted from the light source is incident, the incidence surface is divided into a first area I converting the light emitted from the light source into the first pattern and a second area II converting the light emitted from the light source into the second pattern, first convex cells 510 extended in parallel in a direction orthogonal to the first direction are formed in the first area I, and second convex cells 520 extended in parallel in a direction orthogonal to the second direction are formed in the second area II.

The convex cells 510 and 520 may include a plurality of vertical convex cells 510 extended in parallel in the vertical direction and a plurality of convex cells 520 extended in parallel in the horizontal direction. The vertical convex cells 510 contribute to formation of a horizontal line optical pattern, and light incident upon the vertical convex cells 510 form a long horizontal-shaped optical pattern extended in the horizontal direction. The horizontal convex cells 520 contribute to formation of a vertical line optical pattern, and light incident upon the horizontal convex cells 520 forms a long vertical-shaped optical pattern extended in the vertical direction.

Hereinafter, in definition of names of respective parts of the convex cells 510 and 520, a base part of a convex surface, i.e., a point of the convex surface closest to the exit surface 530, is defined as a valley r (with reference to FIG. 6E), the highest peak of the convex surface, i.e., a point of the convex surface most distant from the exit surface 530, is defined as a peak h (with reference to FIG. 6E), a distance between adjacent valleys (or a distance between adjacent peaks) is defined as a pitch, and a distance between the valley and the peak is defined as a height.

Of course, although a cross-shaped optical pattern may be generated by combination of a lens generating a horizontal line optical pattern and a separate lens generating a vertical line optical pattern, a part of one lens may generate a horizontal line optical pattern and the other part may generate a vertical line optical pattern intersecting the horizontal line optical pattern. The lens 500 which will be described below corresponds to the latter.

The lens 500 includes the incidence surface upon which light emitted from the light source is incident, and the incidence surface is divided into the first area I generating the horizontal line optical pattern and the second area II generating the vertical line optical pattern. A plurality of vertical convex cells 510 is formed in parallel in the first area I, and a plurality of horizontal convex cells 520 intersecting the vertical convex cells 510 is formed in parallel in the second area II.

The center C of the lens 500 is aligned with the center of the light source and located in the first area I. Hereinafter, a distance between the center C of the lens 500 and the boundary B between the first area I and the second area II is defined as an offset distance F. If the overall shape of the lens 500 is a circle, the incidence area of the first area I is greater than the incidence area of the second area II.

In order to increase homogeneity of the optical pattern, the horizontal convex cells 520 may directly contact the vertical convex cell 510 closest to the second area II without an interval.

The angle of view of the lens 500 with respect to the horizontal line may be a wide angle. Here, the wide angle means that the angle of view is greater than the angle of view of a human being and it is known that the angle of view of a human being is generally about 50 degrees. Further, in order to allow the angle of view of the lens 500 with respect to the horizontal line to be greater than the angle of view of the lens 500 with respect to the vertical line, the height Tv of the vertical convex cells 510 may be greater than the height Th of the horizontal convex cells 520.

The angle of view of the lens 500 needs to be set in overall consideration of variables, such as the angle of incidence of light and the angle of reflection of light at the incidence surface, the diameter and thickness of the lens 500, the height and pitch of the convex cells 510 and 520, the offset distance of the lens 500, etc. Hereinafter, definitions of these variables and an optimized design will be described. Particularly, manufacture of a lens having a wide angle of view with respect to a horizontal line forming an optical pattern, i.e., a wide horizontal angle of view, requires a high degree of technical skill in consideration of workability and limits in dimension measurement. Hereinafter, a design in which the lens 500 has a wide horizontal angle of view (i.e., 130±5 degrees) will be described.

(1) Thickness and Diameter of Lens

The thickness T of the lens 500 may be 1.8 to 2.1 mm and the diameter D of the lens 500 may be 0.8 to 1.0 mm. Here, the thickness T of the lens 500 is a distance from the exit surface 530 to the highest peaks h of the convex cells 510 and 520, and the highest peaks h of the vertical convex cells 510 and the horizontal convex cells 520 may be located at positions having the same distance from the exit surface 539. The peaks of the convex cells 510 and peaks of the convex cells 520 are located at the same height from the exit surface 539.

(2) Height and Pitch of Convex Cells

Height to pitch ratios of the convex cells 510 and 520 (hereinafter, referred to as extension ratios) relate to the angle of view. As the extension ratio increases, the angle of view of an emitted optical pattern increases. The angle of view with respect to the horizontal line pattern may be greater than the angle of view with respect to the vertical line pattern so that a wider area in the horizontal direction may be searched. Therefore, the extension ratio of the vertical convex cells 510 may be greater than the extension ratio of the horizontal convex cells 520.

The height Tv of the vertical convex cells 510 may be 1.0 to 1.2 mm and the pitch Pv of the vertical convex cells 510 may be 0.8 to 1.0 mm. Here, the angle of view with respect to a horizontal line forming the optical pattern, i.e., the horizontal angle of view, may be about 130±5 degrees.

The height Th of the horizontal convex cells 520 may be 0.40 to 0.42 mm and the pitch Ph of the horizontal convex cells 520 may be 0.8 to 1.0 mm, i.e., is substantially the same as the pitch Pv of the vertical convex cells 510. In such a structure, the angle of view with respect to a vertical line forming the optical pattern, i.e., a vertical angle of view, may be about 75±5 degrees.

(3) Angle of Incidence and Angle of Reflection of Lens-Profile of Convex Cells

In one random pair of adjacent vertical convex cells 510, an angle a1 formed by a line connecting the common valley and the peak of one vertical convex cell (hereinafter, referred to as a first vertical convex cell) and a line connecting the common valley and the peak of the other vertical convex cell (hereinafter, referred to as a second vertical convex cell) may be within 43 degrees.

If a surface having a distance from the peak h of the vertical convex cell 510 corresponding to ¼ of the height Tv of the vertical convex cell 510 is defined as a ¼ equipotential surface G(0.25), the angle a2 formed by a line connecting the common valley and a point on the ¼ equipotential surface G(0.25) of the first vertical convex cell and a line connecting the common valley and a point on the ¼ equipotential surface G(0.25) of the second vertical convex cell may be within 30 degrees.

If a surface having a distance from the peak h of the vertical convex cell 510 corresponding to ¾ of the height Tv of the vertical convex cell 510 is defined as a ¾ equipotential surface G(0.75), the angle a3 formed by a line connecting the common valley and a point on the ¾ equipotential surface G(0.75) of the first vertical convex cell and a line connecting the common valley and a point on the ¾ equipotential surface G(0.75) of the second vertical convex cell may be within 26 degrees.

The height Tv of the vertical convex cells 510 may be greater than the height Th of the horizontal convex cells 520. Therefore, the valleys of the vertical convex cells 510 are deeper than the valleys of the horizontal convex cells 520, particularly, the valley of the vertical convex cell 510 is deeper than the incidence surface of the second area II at the boundary B between the first area I and the second area II, and thus, interference between light incident upon the incidence surface of the lens 500 and light reflected by the incidence surface may be reduced and light may be uniformly distributed.

(4) Offset Distance F at Center of Lens

As described, the center C of the lens 500 is located in the first area I. Such a structure causes a sufficient amount of light to reach the left and right ends of the horizontal line of the optical pattern and thus forms a continuous horizontal line without interruption. The offset distance F may be 0.4 to 0.6 mm.

Figure 7:
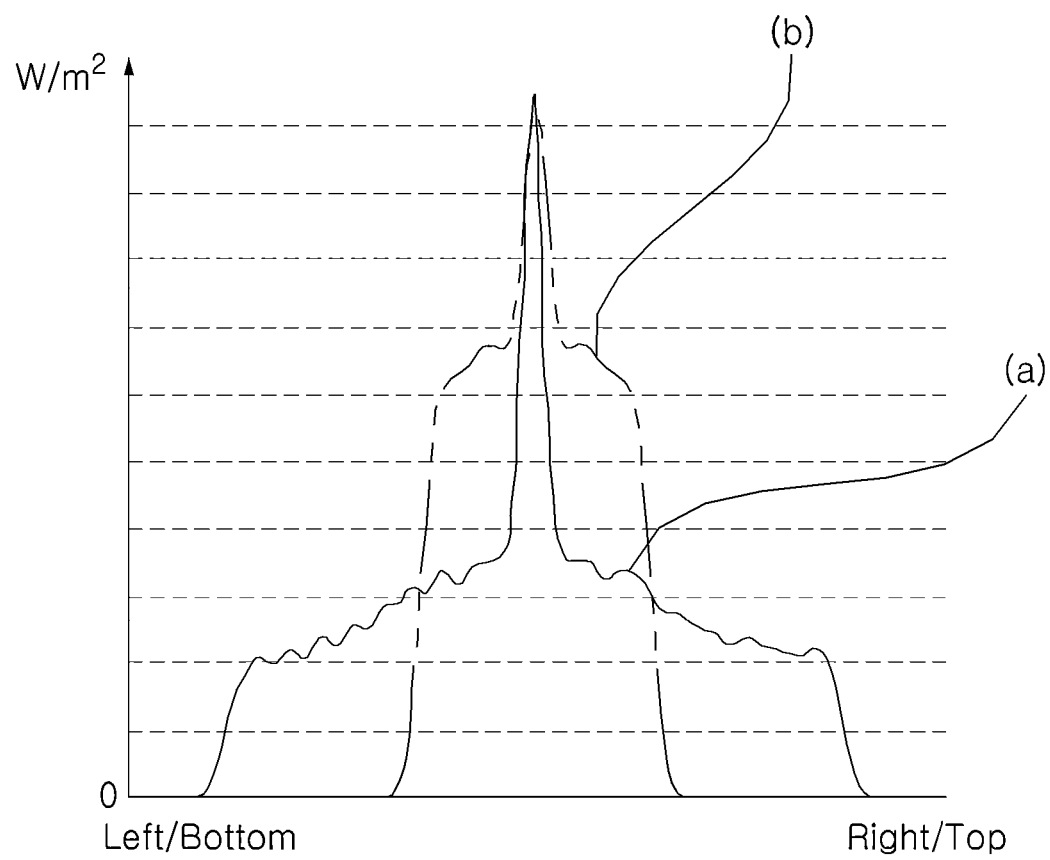
FIG. 7 is a graph illustrating illumination of a cross-shaped pattern.

The lens 500 formed in consideration of the above-described various design dimensions forms an optical pattern including horizontal and vertical lines formed by comparatively uniform light within a designated range, as exemplarily shown in FIG. 7.

Figure 8:
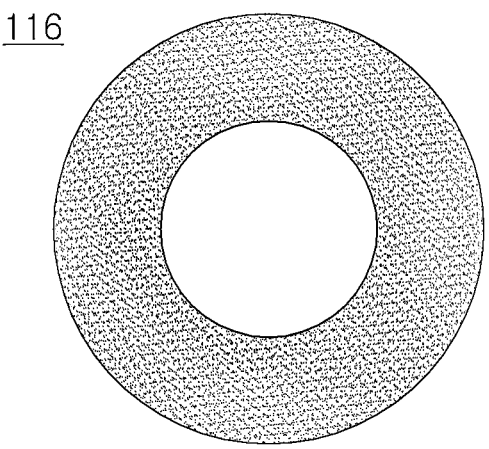
FIG. 8 is a view illustrating an exit surface of a light source of the pattern irradiation unit in accordance with one embodiment of the present invention.

FIG. 8 is a view illustrating an exit surface 116 of the light source of the pattern irradiation unit 110 in accordance with one embodiment of the present invention. With reference to FIG. 8, the exit surface 116 of the light source through which light is emitted may be formed in a closed band type. The center of the light source does not emit light and thus, concentration of light on the center of the lens 500 may be prevented. The exit surface 116 is formed in a ring shape and the inner diameter and the outer diameter of the ring-shaped exit surface 116 are concentric. Although the inner diameter and the outer diameter of the exit surface 116 may be formed in a circle, the inner diameter and the outer diameter of the exit surface 116 may be formed in other closed curves, such as an oval.

With reference to FIG. 4, the lens 500 of the pattern irradiation unit 110 may be aligned on the common vertical line L with the lens (not shown) of the optical pattern unit 120. In a random input image, the length of a vertical line pattern may be varied but the vertical line pattern does not move in the horizontal direction and is located on a predetermined reference line at all times (with reference to FIG. 12). Therefore, the pattern extraction unit 210 may easily find out the vertical line pattern and easily find out a horizontal line pattern also by extracting a line connected to the vertical line pattern in the horizontal direction from the vertical line pattern. Further, since the position of the vertical line pattern is fixed, position information acquired based on a horizontal angle of view with respect to a target object may have a more accurate value.

On the assumption that there is a cliff on the floor on which the robot cleaner is located (for example, a doorstep or stairs), the robot cleaner needs to travel while avoiding such a cliff. The robot cleaner in accordance with this embodiment may sense disappearance of the cross-shaped pattern from an input image and thus recognize a cliff located in front of the robot cleaner by a long distance based on a result of sensing. Hereinafter, a method of recognizing a cliff located in front of the robot cleaner by a long distance will be described.

The pattern extraction unit 210 extracts a vertical line pattern from the input image. The vertical line pattern may be defined as a line having the greatest brightness difference with the peripheral surroundings from among lines extended in the vertical direction in the input image. Here, the vertical line pattern is extracted from the above-described reference line. Then, the pattern extraction unit 210 extracts a line connected to the extracted vertical line pattern in the horizontal direction from the vertical line pattern. The extracted patterns are compared with a designated cross-shaped template serving as a reference and thus, a cross-shaped pattern is recognized.

If, after the cross-shaped pattern is extracted from the input image by the pattern extraction unit 210, no cross-shaped pattern is extracted from an input image acquired again at a random position by the pattern image acquisition unit 120, the robot cleaner may perform avoidance traveling before the robot cleaner moves by a predetermined distance from the random position. The predetermined distance is set to be smaller than a distance from the cliff in front of the robot cleaner. That is, the predetermined distance may be smaller than a distance from the robot cleaner to the cross-shaped pattern (an intersection of the horizontal line and the vertical line) when the optical pattern is emitted to the floor. Thereby, falling of the robot cleaner off the cliff may be prevented. Such avoidance traveling may include not only change of the traveling path of the robot cleaner but also stoppage of the robot cleaner.

In more detail, if, among a plurality of input images acquired according to moving positions of the robot cleaner, the number of input images in which the cross-shaped pattern is located at the same position is a predetermined number N or more, the position information acquisition unit 220 may judge that a floor is present in front of the robot cleaner now. If, after recognition of the floor, no cross-shaped pattern is recognized from input images acquired again according to movement of the robot cleaner (i.e., if the optical pattern is emitted to a region under the cliff and thus the pattern image acquisition unit 120 does not photograph the optical pattern), the position information acquisition unit 220 judges that the cliff is present in front of the robot cleaner. Thereafter, the controller 200 may control the travel driving unit 300 so that the robot cleaner may stop or travel while avoiding the cliff.

FIG. 11(*a*) is a view illustrating a case that a proximal end V(i) is emitted to a floor under the robot cleaner and FIG. 11(*b*) is a view illustrating a case that the proximal end V(i) is emitted to a region under a cliff. With reference to FIGS. 11(*a*) and 11(*b*), the robot cleaner may recognize a vertical line pattern P2 in an input image and sense a cliff in front of the robot cleaner by a short distance based on position information of an end V(i) proximal to the robot cleaner P2, i.e., the proximal end V(i), among both ends of the vertical line pattern P2.

Figure 9A:
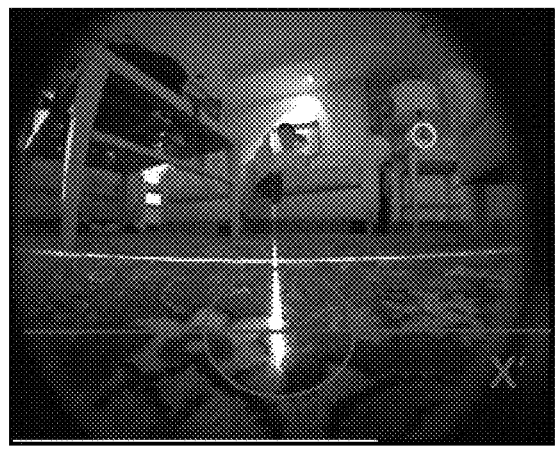
FIG. 9A is an input image in which optical pattern is photographed.
Figure 9B:
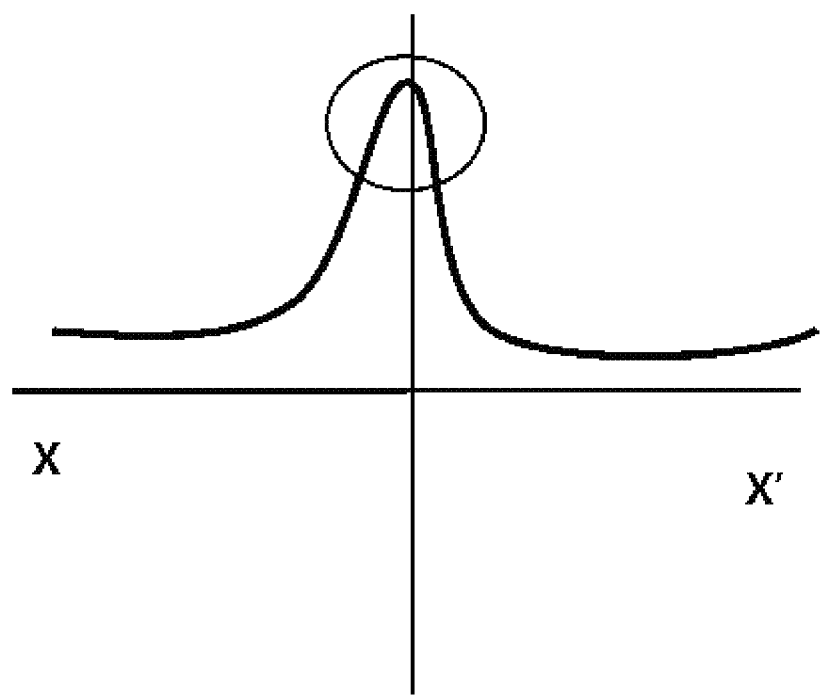
FIG. 9B is a graph illustrating brightnesses of points on the line X-X' of FIG. 9A.
Figure 12A:
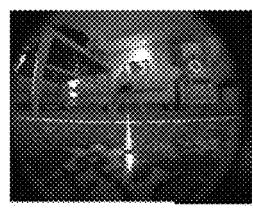
FIGS. 12(a) to 12(e) are photographs illustrating input images captured in various directions in which the vertical line pattern is located at a regular position at all times.
Figure 12B:
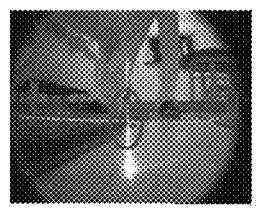
Figure 12C:
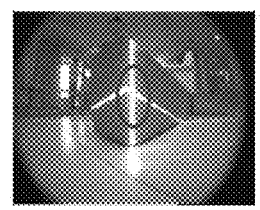
Figure 12D:
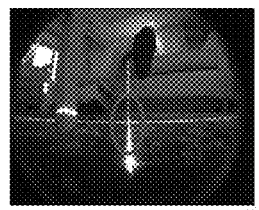
Figure 12E:
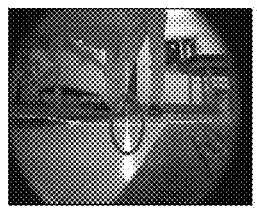

The pattern extraction unit 210 extracts the vertical line pattern P2 from the input image. From among points recognized in the horizontal direction (in the direction X-X', with reference to FIGS. 9A and 9B) in the input image, points brighter than the peripheral surroundings by a designated level or more are selected as candidate points and a line on which these candidate points are arranged in the vertical direction is defined as the vertical line pattern P2.

The pattern extraction unit 210 may compare brightnesses of the points along the recognized vertical line pattern P2 and extract the proximal end V(i) of the vertical line pattern from a region in which brightness is suddenly changed by a predetermined degree or more.

The position information acquisition unit 220 acquires position information corresponding to the proximal end V(i) recognized through the pattern extraction unit 210, particularly, a distance from a position to which the proximal end V(i) is emitted, and judges that a cliff is present in front of the robot cleaner by a short distance if the acquired distance is greater than a predetermined floor distance (with reference to FIG. 11(*b*)). Thereafter, the controller 200 may control the travel driving unit 300 so that the robot cleaner may stop or travel while avoiding the cliff prior to moving by a predetermined movement distance. The predetermined movement distance, which is a safe distance to prevent the robot cleaner from falling off the cliff in front of the robot cleaner, may be shorter than a distance from the robot cleaner to the proximal end V(i) of the vertical line optical pattern. Thereby, falling of the robot cleaner off the cliff may be prevented. Such avoidance traveling may include not only change of the traveling path of the robot cleaner but also stoppage of the robot cleaner.

As apparent from the above description, a mobile robot in accordance with the present invention may generate a cross-shaped optical pattern using one lens.

Further, the mobile robot in accordance with the present invention may emit a cross-shaped optical pattern in which light is uniformly distributed. Particularly, dispersion of light at the end of a horizontal line optical pattern may be prevented.

Further, the mobile robot in accordance with the present invention may emit a uniform optical pattern while increasing a horizontal angle of view.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile robot comprising:
a mobile main body; and
a pattern irradiation unit to emit an optical pattern, including a first pattern comprising a line extending in a first direction and a second pattern comprising a line extending in a second direction intersecting the first pattern, to a region around the main body,
wherein the pattern irradiation unit includes:
a light source to emit light; and
a lens to convert the light emitted from the light source into the optical pattern,
wherein the lens includes convex cells on an incidence surface upon which light emitted from the light source is incident, the incidence surface is divided into a first area to convert the light emitted from the light source into the first pattern and a second area to convert the light emitted from the light source into the second pattern,
wherein a first plurality of first convex cells, wherein the first plurality extends in a direction orthogonal to the first direction, are formed in parallel in the first area and a second plurality of second convex cells, wherein the second plurality extends in a direction orthogonal to the second direction, are formed in parallel in the second area,
wherein a boundary separates the first area and the second area.

2. The mobile robot according to claim 1 wherein:
the optical pattern is a cross-shaped optical pattern;
the first direction is the horizontal direction and the first pattern comprising a line extending in the first direction is a horizontal line optical pattern;
the second direction is the vertical direction and the second pattern comprising a line extending in the second direction is a vertical line optical pattern;
the first convex cells are vertical convex cells; and
the second convex cells are horizontal convex cells.

3. The mobile robot according to claim 2, wherein the first area is greater than the second area.

4. The mobile robot according to claim 1, wherein a center of the lens is located in the first area.

5. The mobile robot according to claim 1, wherein an angle of view of the lens with respect to the first pattern is greater than an angle of view of the lens with respect to the second pattern.

6. The mobile robot according to claim 1, wherein a height of the first convex cells is greater than a height of the second convex cells.

7. The mobile robot according to claim 1, wherein peaks of the first convex cells and peaks of the second convex cells are located at the same height from an exit surface of the lens.

8. The mobile robot according to claim 1, wherein a height to pitch ratio of the first convex cells is greater than a height to pitch ratio of the second convex cells.

9. The mobile robot according to claim 1, wherein an angle formed between a line connecting a common valley of adjacent first convex cells to a peak of one of the adjacent first convex cells and a line connecting the common valley to a peak of the other adjacent first convex cell is within 43 degrees.

10. The mobile robot according to claim 1, wherein an angle formed between a line connecting a common valley of adjacent first convex cells to a point corresponding to ¼ of the height from a peak of one of the adjacent first convex cells and a line connecting the common valley to a point corresponding to ¼ of the height from a peak of the other adjacent first convex cell is within 30 degrees, wherein the height is defined as the distance from the valley of a first convex cell to the peak of the first convex cell.

11. The mobile robot according to claim 1, wherein an angle formed between a line connecting a common valley of adjacent first convex cells to a point corresponding to ¾ of the height from a peak of one of the adjacent first convex cell and a line connecting the common valley to a point corresponding to ¾ of the height from a peak of the other adjacent first convex cell is within 26 degrees, wherein the height is defined as the distance from the valley of the convex cell to the peak of the first convex cell.

12. The mobile robot according to claim 1, wherein the second convex cells contact the first convex cell closest to the second area.

13. The mobile robot according to claim 1, wherein a valley between a pair of the first convex cells adjacent to each other, is deeper than a valley between a pair of the second convex cells adjacent to each other, at the boundary.

14. The mobile robot according to claim 1, wherein the light source includes an exit surface formed in a closed band type.

15. The mobile robot according to claim 1, wherein the light source includes a laser diode.

16. The mobile robot according to claim 1, wherein a main axis of the lens is downward from a horizontal line.

17. The mobile robot according to claim 1, further comprising a pattern image acquisition unit to acquire an input image of an area to which the optical pattern is emitted.

18. The mobile robot according to claim 17, wherein the lens of the pattern irradiation unit and a lens of the pattern image acquisition unit are aligned on a vertical line.

19. The mobile robot according to claim 17, further comprising a pattern extraction unit to extract a designated pattern from the first input image acquired by the pattern image acquisition unit.

20. The mobile robot according to claim 19, wherein, if, after the cross-shaped pattern is extracted from the first input image by the pattern extraction unit, no cross-shaped pattern is extracted from a second input image acquired again at a random position by the pattern image acquisition unit, the mobile robot performs avoidance traveling before the mobile robot moves by a predetermined distance from the random position.

21. The mobile robot according to claim 19, wherein, if a proximal end of the vertical line optical pattern having the shortest distance from the mobile main body is not detected from the input image by the pattern extraction unit, the mobile robot performs avoidance traveling before the mobile robot moves by a predetermined distance.

* * * * *